United States Patent [19]

Singh

[11] Patent Number: 5,773,057
[45] Date of Patent: Jun. 30, 1998

[54] LOW-FAT GROUND MEAT PRODUCTS

[75] Inventor: Prem S. Singh, Glenellyn, Ill.

[73] Assignee: Swift-Eckrich, Inc., Downers Grove, Ill.

[21] Appl. No.: 672,057

[22] Filed: Jun. 26, 1996

[51] Int. Cl.$^6$ ............................. A23J 3/08; A23L 1/0562; A23L 1/314; A23L 1/317

[52] U.S. Cl. ............................ 426/61; 426/104; 426/574; 426/646; 426/802

[58] Field of Search .............................. 426/61, 574, 646, 426/641, 802, 104

[56] References Cited

U.S. PATENT DOCUMENTS

| | | |
|---|---|---|
| 554,269 | 2/1896 | Hetherington . |
| 589,155 | 8/1897 | Bernstein . |
| 1,087,515 | 2/1914 | Sprenger et al. . |
| 1,609,617 | 12/1926 | Frohring . |
| 1,704,458 | 3/1929 | Brehm . |
| 1,737,101 | 11/1929 | Turnbow . |
| 2,171,428 | 8/1939 | Griffith et al. . |
| 2,344,090 | 3/1944 | Huber et al. . |
| 2,369,095 | 2/1945 | Wendt . |
| 2,493,777 | 1/1950 | Reyniers . |
| 2,560,621 | 7/1951 | Wrenshall . |
| 2,618,629 | 11/1952 | Trexler . |
| 2,665,989 | 1/1954 | Howard et al. . |
| 2,813,794 | 11/1957 | Anson et al. . |
| 2,876,115 | 3/1959 | Epstein . |
| 2,964,409 | 12/1960 | Sair . |
| 3,050,400 | 8/1962 | Poarch et al. . |
| 3,093,483 | 6/1963 | Ishler et al. . |
| 3,179,521 | 4/1965 | Poarch . |
| 3,368,901 | 2/1968 | Thompson . |
| 3,447,932 | 6/1969 | Olson et al. . |
| 3,482,996 | 12/1969 | Christianson et al. . |
| 3,535,122 | 10/1970 | Mussellwhite et al. . |
| 3,627,536 | 12/1971 | Arima et al. . |
| 3,711,291 | 1/1973 | Leidy et al. . |
| 3,713,837 | 1/1973 | Leidy et al. . |
| 3,719,498 | 3/1973 | Leidy et al. . |
| 3,719,499 | 3/1973 | Hai et al. . |
| 3,836,678 | 9/1974 | Leidy et al. . |
| 3,840,677 | 10/1974 | Leidy et al. . |
| 3,840,679 | 10/1974 | Liepa et al. . |
| 3,852,506 | 12/1974 | Burge et al. . |
| 3,930,056 | 12/1975 | Feminella et al. . |
| 3,986,890 | 10/1976 | Richter et al. . |
| 4,118,520 | 10/1978 | Visser et al. . |
| 4,123,557 | 10/1978 | Epstein et al. . |
| 4,133,897 | 1/1979 | Flanyak et al. . |
| 4,143,171 | 3/1979 | Buckley et al. . |
| 4,143,172 | 3/1979 | Mitchell et al. . |
| 4,143,174 | 3/1979 | Shah et al. . |
| 4,159,982 | 7/1979 | Hermansson . |
| 4,161,552 | 7/1979 | Melachouris . |
| 4,168,322 | 9/1979 | Buckley et al. . |
| 4,178,394 | 12/1979 | Kumar . |
| 4,202,907 | 5/1980 | Poarch . |
| 4,202,909 | 5/1980 | Pederson, Jr. . |
| 4,209,503 | 6/1980 | Shah et al. . |
| 4,219,583 | 8/1980 | Igoe . |
| 4,239,784 | 12/1980 | Guiraud et al. . |
| 4,251,562 | 2/1981 | LeGrand et al. . |
| 4,251,567 | 2/1981 | Ohyabu . |
| 4,259,363 | 3/1981 | Lauck et al. . |
| 4,293,571 | 10/1981 | Olofsson et al. . |
| 4,303,682 | 12/1981 | Guitteny et al. . |
| 4,324,807 | 4/1982 | Kim et al. . |
| 4,332,823 | 6/1982 | Buemi . |
| 4,338,340 | 7/1982 | Morimoto et al. . |
| 4,348,420 | 9/1982 | Lynch et al. . |
| 4,361,588 | 11/1982 | Herz . |
| 4,362,750 | 12/1982 | Swartz . |
| 4,376,134 | 3/1983 | Kumar . |
| 4,399,164 | 8/1983 | Lauck et al. . |
| 4,492,712 | 1/1985 | Casella . |
| 4,492,715 | 1/1985 | Casella . |
| 4,495,205 | 1/1985 | Brander et al. . |
| 4,497,834 | 2/1985 | Barta . |
| 4,504,515 | 3/1985 | Hohenester et al. . |
| 4,537,783 | 8/1985 | Liepa . |
| 4,551,351 | 11/1985 | Kawasaki et al. . |
| 4,556,570 | 12/1985 | Brander et al. . |
| 4,559,233 | 12/1985 | Chen et al. . |
| 4,656,041 | 4/1987 | Yagi et al. . |
| 4,702,924 | 10/1987 | Owens et al. . |
| 4,720,390 | 1/1988 | Bachler et al. . |
| 4,734,287 | 3/1988 | Singer et al. . |
| 4,738,864 | 4/1988 | Ernster ................................... 426/641 |
| 4,844,922 | 7/1989 | Uemura et al. . |
| 4,863,749 | 9/1989 | Yamada . |
| 4,904,496 | 2/1990 | Izzo et al. ................................ 426/646 |
| 4,973,488 | 11/1990 | Ernster . |
| 4,981,704 | 1/1991 | Thibault . |
| 5,011,702 | 4/1991 | Tamaki et al. . |
| 5,039,538 | 8/1991 | Tamaki et al. . |
| 5,039,539 | 8/1991 | Tamaki et al. . |
| 5,093,028 | 3/1992 | Kyogoku et al. . |
| 5,100,688 | 3/1992 | Cox et al. . |
| 5,106,643 | 4/1992 | Laufer . |
| 5,112,626 | 5/1992 | Huang et al. . |
| 5,171,603 | 12/1992 | Singer et al. . |

(List continued on next page.)

OTHER PUBLICATIONS

H1394–Dreese, P.C. "Method of Preparing Reduced Fat Spreads", Jan. 3, 1995, United States Statutory Invention Registration.

T896,050–Olson, F.C., et al. "Comminuted Meat Composition Containing Undenatured Water–Soluable Lac Lactalbumin", Mar. 28, 1972, Defensive Publication.

*Primary Examiner*—Arthur L. Corbin
*Attorney, Agent, or Firm*—Pretty, Schroeder & Poplawski

[57] ABSTRACT

Disclosed are low-fat, ground meat food products formed from an admixture containing from about 40 to about 95 wt. % ground meat particles and from about 60 to about 5 wt. % therma-irreversible, hydrolyzed milk protein gel particles, the gel particles having a particle size of from about 1/32" to about 1" in their longest dimension and, preferably, a gel strength of between about 2500 gms and about 30,000 gms. Also disclosed are cooked and fermented, low-fat sausage products made from such admixtures, the average particle size of the gel particles in the sausage products being from about 0.5 to about 1.5 times the average particle size of the ground meat particles.

26 Claims, No Drawings

U.S. PATENT DOCUMENTS

| | | |
|---|---|---|
| 5,175,013 | 12/1992 | Huang et al. . |
| 5,188,842 | 2/1993 | Visser et al. . |
| 5,196,219 | 3/1993 | Hsu et al. . |
| 5,206,050 | 4/1993 | Jennings . |
| 5,217,741 | 6/1993 | Kawachi et al. . |
| 5,232,722 | 8/1993 | Obara et al. . |
| 5,232,723 | 8/1993 | Bisson et al. . |
| 5,232,729 | 8/1993 | Katsuta et al. . |
| 5,232,731 | 8/1993 | Cain et al. . |
| 5,238,701 | 8/1993 | Dubanchet . |
| 5,294,455 | 3/1994 | O'Brien et al. . |
| 5,300,312 | 4/1994 | Lusas et al. . |
| 5,304,387 | 4/1994 | Hine . |
| 5,324,531 | 6/1994 | Hoefler et al. . |
| 5,330,778 | 7/1994 | Stark et al. . |
| 5,350,590 | 9/1994 | McCarthy et al. . |
| 5,358,730 | 10/1994 | Dame-Cahagne et al. . |
| 5,368,869 | 11/1994 | Savello et al. . |
| 5,368,878 | 11/1994 | Smick et al. . |
| 5,374,441 | 12/1994 | Gibson et al. . |
| 5,401,527 | 3/1995 | Brown et al. . |
| 5,413,804 | 5/1995 | Rhodes . |
| 5,433,968 | 7/1995 | Zarraga et al. . |
| 5,433,969 | 7/1995 | McMindes et al. . |
| 5,437,885 | 8/1995 | Lusas et al. . |
| 5,447,741 | 9/1995 | Goldman . |
| 5,458,904 | 10/1995 | Zolper . |
| 5,494,696 | 2/1996 | Holst et al. . |
| 5,676,987 | 10/1997 | Lai ............ 426/104 |

LOW-FAT GROUND MEAT PRODUCTS

BACKGROUND OF THE INVENTION

1. Field of the Invention

The present invention relates to the chemical arts. In particular, it relates to novel, low-fat food products and methods for making them.

2. Discussion of the Related Art

There is an ever-increasing interest among consumers in food products containing less fat than products having a traditional, full-fat content. Such low-fat products are useful in controlling body weight and reducing the risk of heart disease. Nevertheless, judging from the consistently high incidents of obesity and of heart disease, consumers appear reluctant to sacrifice good tasting food for better health.

Traditional, ground meat food products, including sausages such as salami and pepperoni, are renowned for their flavor, but generally contain from about 25% to about 50% fat, by weight. For example, salami typically contains about 34% fat, while pepperoni typically contains about 44% fat.

The public's insatiable demand for low-fat foods has fueled the search for methods of making low-fat ground meat food products that do not leave the meat bereft of the appearance, texture and flavor normally associated with full-fat ground meat food products having the traditional fat content. Low-fat, ground meat food products have been developed in an effort to reduce fat content, but have not resulted in a satisfying alternative, because they are riddled with an unappealing appearance and an unpalatable mouthfeel and flavor.

Unfortunately, merely eliminating the fat from these types of meat food products results in a disagreeable chewy texture as well as a monotonous taste. The mouthfeel of the natural fat in ground meat food products, such as sausages, is a function not only of the melting and juiciness characteristic of lard or tallow, but also of the underlying texture of the adipose or fat tissue. At warm temperatures, the tissue is not liquid, but is smooth, springy, somewhat slippery and chewy.

Furthermore, when fat is removed from ground meat food products, the appearance of the food product, especially a product such as sausage that traditionally contains readily identifiable, discrete particles of white fat distributed across its cross section to complement the lean look of the meat product, is adversely affected. Numerous attempts have been made to mimic the physical and visual attributes of fat in meat food products. While these attempts have been reported to improve the delivery of juiciness at serving temperatures, they have failed to recreate the unique flavor, texture and appearance of fat tissue.

It is known to add ungelled, milk protein hydrolyzate as a binder in ground meat products such as beef patties and hot dogs. Upon cooking under substantially uncontrolled conditions the milk protein hydrolyzate forms an internal gel or aggregate matrix enrobing the meat particles. The internal matrix is said to reduce cooking losses.

Because of the high fat content of conventional ground meat food products, there has long been a significant need for low-fat, ground meat food products that have a flavor, texture and appearance comparable to conventional meat products having a traditional fat content. The compositions and methods of the present invention meet these needs and provide related advantages as well.

SUMMARY OF THE INVENTION

Now in accordance with the invention, there is provided low-fat, ground meat food products with much of the flavor, texture and appearance of conventional ground eat food products that have a traditional, full-fat content. These novel, low-fat, ground eat food products, including fermentable meat products, are formed from an admixture containing from about 40 to about 95 wt. %, preferably from about 70 to about 90 wt. %, and most preferably from about 78 to about 85 wt. %, based on the weight of the ground meat product, ground meat, preferably beef, pork, poultry, mutton, and mixtures thereof. The meat products also contain 60 to about 5 wt. %, preferably from about 30 to about 10 wt. %, and most preferably from about 22 to about 15 wt. %, based on the weight of the ground meat product, fat-like particles made of hydrolyzed milk protein gel particles having a particle size of from about 1/32" to about 1", preferably from about 1/16" to about 3/4", and most preferably about 1/8" to about 3/8" in their longest dimension. Preferably, the hydrolyzed milk protein gel has a gel strength of between about 2500 gms and about 30,000 gms. The fermentable, low-fat meat products also contain an effective amount of an acid producing bacteria, preferably a lactic acid producing bacteria. The gel particles are formed of an external matrix of the hydrolyzed milk protein gel, i.e., the gel is formed before adding the hydrolyzed milk protein to the ground meat, so that the particles do not include ground meat particles in their matrices.

Also disclosed are cooked and fermented, low-fat sausage products made from such admixtures. Preferred cooked sausage products include low-fat cotto salami. Preferred fermented sausage products include hard salami, Genoa salami, and pepperoni. The cooked and fermented, low-fat sausage products contain an admixture of ground meat particles, preferably particles of beef, pork, poultry, mutton, and mixtures thereof, and hydrolyzed milk protein gel particles. The average particle size of the gel particles in the sausage products is from about 0.5 to about 1.5 the average particle size of the ground meat particles and the gel, preferably, has a gel strength of between about 2500 gms and about 30,000 gms. Also provided are methods for making the fat-like external gel particles and for making low-fat, ground meat food products containing the fat-like particles.

DETAILED DESCRIPTION OF THE PREFERRED EMBODIMENTS

The present invention provides low-fat, ground meat food products and methods of making low-fat, ground meat food products that retain the flavor and physical characteristics of ground meat food products having a traditional, full-fat content. Disclosed herein is the discovery that external, thermo-irreversible, hydrolyzed milk protein gels can be effectively used in food products, including ground meat food products, and preferably in low-fat, ground meat food products, including both cooked and fermented sausages. The external gels mimic the appearance, mouthfeel and flavor of fat tissue. When the gels are included in a low-fat meat food product, they provide lubricity and body to the food with the juicy and tender texture, as well as the appearance, characteristic of meat foods having the traditional fat content.

These low-fat foods can be ready-to-serve foods, prepared ready-to-cook foods or raw foods and may include other ingredients commonly found in meat food products such as, for example, vegetables, pastry, breading, gravy, seasonings and the like. And while this invention can be applied to any type of food which might otherwise contain particles of natural fat, the present invention is well suited to produce ground meat food products, such as ground beef, hamburger, meatballs, hash, meat dumplings and meat loaves.

The present invention is especially well suited for the preparation sausages, including both cooked and fermented sausages. Representative cooked sausages include cotto salami.

Fermented sausages are characterized by their tangy flavor and in most cases chewy texture. The are generally made from pork, mixtures of beef and pork or beef. The characteristic tang results from bacterial fermentation during which lactic acid and other byproducts of fermentation accumulate. The pH of fermented sausages typically ranges from 5.2 to 4.6. Fermented sausages include both dry and semi-dry varieties. Representative fermented, dry sausages include Genoa salami, hard salami, and pepperoni. Representative fermented, semi-dry sausages include summer sausage, farmer sausage, and chorizo.

Meats useful in the practice of the present invention include, for example, any one or combination of the following meats: beef, pork, poultry, mutton, and the like. Preferably, meats useful in the practice of the present invention are low-fat meats. The term low-fat as used herein refers to foods having a fat content of only about 35%, or preferably only about 25%, or more preferably only about 10% or most preferably only about 5% or less, based on the weight of the food product.

The ground meat is combined with an edible, thermo-irreversible, external gel made by the controlled gelation of hydrolyzed milk protein. One method of forming a thermo-irreversible hydrolyzed milk protein gel begins with forming a slurry of hydrolyzed milk protein with water having a temperature less than about 55° C. Partially hydrolyzed milk protein gel is an excellent source of protein for the human diet. Hydrolyzed milk protein products useful in accordance with the invention are available commercially. One such product is AMP 80 available from AMPC, Ames, Iowa.

Preferably, the slurry is formed from about 10 wt. % to about 90 wt. %, more preferably from about 20 wt. % to about 40 wt. %, hydrolyzed milk protein and from about 90 wt. % to about 10 wt. %, more preferably from about 80 wt. % to about 60 wt. %, water, based on the total weight of the slurry. In a most preferred embodiment, the slurry contains from about 20 wt. % to about 25 wt. % hydrolyzed milk protein and from about 80 wt. % to about 75 wt. % water, based on the total weight of the slurry.

The solid, hydrolyzed milk protein is slowly added to the cool water in a mixing kettle to avoid lumping. The ingredients are then mixed, for example with a rotary impeller-type mixer, to form a homogeneous mixture, free of lumps and air pockets. Care is taken to prevent incorporating excessive air. In some embodiments, a food grade antifoaming agent is added in a sufficient amount, typically from about 10 to about 100 parts per million, to depress the formation of air bubbles and excessive foam. Suitable antifoaming agents include SHG 730 and SHG 840 available from OSI Specialties, Danbury, Conn. Additionally in some embodiments, the slurry can be deaerated before subsequent heating.

In some embodiments, the slurry also contains sodium tripolyphosphate. The amount of sodium tripolyphosphate is preferably from about 0.1 wt. % to about 1 wt. %, more preferably from about 0.2 wt. % to about 0.6 wt. %, based on the weight of the slurry. In some embodiments, the sodium tripolyphosphate is added to the water along with the hydrolyzed milk protein. In other embodiments, a mixture of sodium tripolyphosphate and water is added to the hydrolyzed milk protein slurry.

The slurry is then pumped into a process kettle where gentle mixing is maintained to prevent the slurry from settling until a predetermined amount of the slurry is pumped into moisture-proof, plastic, cylindrical tubes or casings, typically having a diameter of from about 6" to about 8". The amount of slurry is chosen so that sufficient space is left in the casings to permit the expansion of the slurry during subsequent heating. Additionally, in some embodiments, pin holes are punched in the casing to permit entrapped air to escape during heating.

Once the casings are filled, their ends are sealed, and their contents heated for a time sufficient to kill undesirable microorganisms in and cause the desired gelation of the hydrolyzed milk protein. For example, the sealed casings are placed in racks in steam boxes, or in some embodiments smokehouses, and slowly steam-heated until their internal temperature reaches from about 70° C. to about 100° C. and, more preferably, from about 72° C. to about 90° C. and a thermo-irreversible gel is formed. The extent of gelation is controlled to provide a suitable texture for the subsequent processing and the food formulation contemplated. In preferred embodiments, the casings are placed horizontally in the racks, to avoid settling of the hydrolyzed milk protein during filling and cooking and to provide uniformity in the finished gel.

The gel is showered with cold water, cured, for example, by cooling overnight at about 40° C., and then removed from its casing. Under these conditions, the hydrolyzed milk protein produces an opaque, substantially tasteless, thermo-irreversible gel. Its gel strength, as measured by force of fracture on a TA-TX2 Texture Analyzer, is generally between about 2,500 gms and about 30,000 gms, more preferably between about 10,000 gms and about 18,000 gms. The gel does not melt or liquefy when subjected to mechanical forces, such as the mixing and grinding forces encountered during subsequent processing. Furthermore, the gel does not melt or liquefy upon heating to normal cooking temperatures. The water holding capacity of the gel is sufficiently high that a rigid, external matrix is formed, but it is not so high that the gel will continue to bind all its water during subsequent processing, for example, during the drying of dry and semi dry sausages.

The external gel is then shaped or ground to a particle size suitable for use in the food of interest. In some embodiments, the thermo-irreversible, hydrolyzed milk protein gel is pre-ground prior to adding to a food, or if the food is amenable to mincing the thermo-irreversible, hydrolyzed milk protein gel is added to the food and the combination ground together. Alternatively, thermo-irreversible, hydrolyzed milk protein gel is molded to a desired shape or particle size during formation of the gel. In a presently preferred embodiment of the invention, the thermo-irreversible, hydrolyzed milk protein gel is formed into particles that are from about 1/32" to about 1", preferably from about 1/16" to about 3/4", and most preferably about 1/8" to about 3/8" in their longest dimension.

The amount of thermo-irreversible hydrolyzed milk protein gel included in the low-fat food products of the present invention and the methods of the present invention will depend upon the fat content normally associated with their traditional counterparts and the desired texture and flavor of the low-fat food products. One of ordinary skill in the art will be able to determine the amount of hydrolyzed milk protein gel to be used in a particular formulation without undue experimentation. For example, in a low-fat, ground meat food made in accordance with the present invention, the particles of ground meat are generally present in a range of from about 40 to about 95 wt. %, preferably from about 70 to about 90 wt. %, and most preferably from about 78 to about 85 wt. %, based on the weight of the ground meat product. The hydrolyzed milk protein gel particles are generally present in a range of from about 60 to about 5 wt. %, preferably from about 30 to about 10 wt. %, and most preferably from about 22 to about 15 wt. %, based on the weight of the ground meat product.

It is an advantage that the hydrolyzed milk protein gels can be combined with meat and processed into meat products using conventional techniques. The meat can be pre-cooked or raw. If the meat is raw, the admixture of pre-gelled hydrolyzed milk protein with meat and other ingredients can be packaged raw. Alternatively, the admixture of pre-gelled hydrolyzed milk protein with meat and other ingredients can be cooked or fermented, dried and then packaged.

For example, in the preparation of fermented sausages, most preferably, from about 22 to about 15 wt. % of the gel is admixed with ground meat along with an acid producing bacteria, preferably a lactic acid producing bacteria. Suitable sources include commercially available starter cultures or custom meat cultures. The starter culture or the custom meat culture, which can be either dry or frozen, must be safe to use in foodstuffs. The choice of starter culture or custom meat culture, along with particular proportions and amounts will depend upon the desired final flavor, texture and appearance of the particular fermented sausage and will be readily determinable without undue experimentation.

The admixture also generally contains from about 0.5 to about 2% dextrose. The dextrose provides a nutrient source for the fermentation bacteria that produce the lactic acid and other byproducts giving the fermented sausage its characteristic tangy flavor. The acid also lowers the pH of the sausage and that, in turn, inhibits the growth of spoilage microorganisms. Generally, the gelatin will be added in an amount from about 0.1 wt. % to about 2 wt. %, based on the weight of the admixture. Additional, conventional ingredients that are preferably added to the admixture include salt, spices, sodium nitrite, dextrose, flavorings, such as natural smoke flavor, and antioxidants.

The resulting admixture is reground, so that the thermo-irreversible, hydrolyzed milk protein gel has an average particle size of from about 0.5 to about 1.5 times the particle size of the ground meat. For example, for pepperoni or salami the particle size of the gel in the admixture is typically about 7/64". After regrinding, the admixture is stuffed into a suitable casing. The mixture is kept cold, typically between about −2° C. to about 1° C., during grinding and throughout the stuffing to avoid smearing and for proper particle size control. And during stuffing, care is taken that no air is introduced into the admixture or that any air in the admixture is evacuated, to prevent air pockets which can cause fading of the meat and formation of fat deposits during subsequent processing.

After the cases have been stuffed, the admixture is placed in "green rooms" or smokehouses for several days under conditions of regulated temperature, humidity, and microbiology and fermented in order to permit growth of selected bacteria. If the green rooms are too dry, the surface of the sausage can become denatured and a thick, hard shell is formed. Once there is such a shell, dehydration of the product becomes difficult, which can lead to surface collapse and excessive wrinkles. On the other hand, too much humidity can lead to color problems and the breakdown of fat particles. Fermentation continues until a predetermined pH, typically from about 5.2 to about 4.6, is reached. After the desired pH is obtained, the fermentation may be terminated by heating the sausage to a temperature sufficient to inactivate the fermentation bacteria.

After fermentation, the sausage is dried for two or three weeks or longer under conditions of controlled temperature, relative humidity, product tang, density, air flow, and microbiology. Representative conditions include a temperature of about 10° C. to about 16° C., a relative humidity of about 40% to about 60%, and from about 15 to about 30 air changes in the drying room. During drying, the sausage loses from about 30% to about 40% of its initial weight and achieves its desired moisture to protein ratio. If the rate of moisture loss is too slow, the color and texture will be adversely affected—the color dull and the surface soft. If the rate of moisture loss is too fast, the sausage surface can become denatured, which can make further dehydration of the product difficult and can lead to surface collapse and excessive wrinkles.

It is an advantage of sausages containing the hydrolyzed milk protein gels in accordance with the invention, that the final products have the substantially the same moisture to protein ratios as characterizes their traditional counterparts. For example, low-fat sausages having the following moisture to protein ratios can be prepared: hard salami—1.9:1, Genoa salami—2.3:1, pepperoni—1.6:1, and summer sausage—3.7:1 (refrigerated)/3.1:1 (shelf-stable).

The following examples are included to further illustrate the invention. They are not limitations thereon. All percentages are based on weight, unless otherwise clearly indicated.

EXAMPLE 1

A low-fat salami having 50% of the fat content of its traditional counterpart was prepared by the following method.

Preparation of Hydrolyzed Milk Protein Gel

Seven hundred pounds of cold water (about 15°–30° C.) was metered into a mixing kettle equipped with a rotary mixer using an automatic magnetic flowmeter along with 4 pounds of sodium tripolyphosphate. The mixer was started and 200 pounds of hydrolyzed milk protein (AMPC Inc., Ames, Iowa) were slowly introduced. The ingredients then were mixed until a smooth, non-lumpy slurry was obtained.

Using a positive displacement pump, the slurry was then pumped into a second kettle, also equipped with a rotary mixer. Mixing was continued as a second displacement pump pumped a predetermined amount of the slurry into moisture-proof casings having a 6" diameter. Sufficient free space was provided in the casings to allow for the expansion of the slurry during subsequent heating. Additionally, tiny holes were punched through the casing to permit entrapped air to escape during the heating.

Once filled, the casing were horizontally loaded onto cooking racks, such as are conventionally used in the meat processing industry, and the racks placed in steam boxes. The steam boxes were started with the dry bulb and the wet bulb set at about 90° C. The slurry was heated until an internal temperature of 77° C. was reached. The racks were then showered with cold water to cool the casings and their contents and to rinse away the debris collected on the casing surfaces during cooking.

The racks were then moved to a chill room (kept at about 1°–3° C.) and the casings chilled overnight to temperature less than 4° C., but above freezing. The next morning the casings were stripped from the chilled gel, and the gel ground into particles having a particle size of about ½" in their longest dimension.

Preparation of Low-Fat Salami

Three hundred seventy-seven pounds of pork and 362 pounds of beef were each coarse ground into particles having a particle size about ½" in their longest dimension. The resulting particles were then blended for five minutes to form a homogeneous mixture having a fat content of about 15 wt. %., 0.2 parts lactic acid producing starter culture (ABC Research, Gainesville, Fla.) were added to the meat particles and they were mixed together for about 3–5 minutes until a uniform blend was obtained. Salt (2.5 wt. %), dextrose (2.4 wt. %), and corn syrup, (1.0 wt. %) were then added to the blend, along with spices, gelatin, natural smoke flavor, antioxidant, and sodium nitrite.

Two hundred pounds of the hydrolyzed milk protein gel particles were added to the resulting blend and the admixture reground through a 7/64" grinder plate. A multivane stuffer was used to stuff the admixture into suitable casings. The stuffed casings were then hung in fermentation chambers and the casings cleaned of excess meat, outside contaminants, and the like. The temperature in the chamber was maintained at 32° C. for about 13 hours until the pH of the meat dropped to about 4.9. The temperature was then raised to 63° C. dry bulb and 57° C. wet bulb for about 2–3 hours until the internal temperature of the sausage reached 52° F.

The resulting fermented sausage was then transferred to a dry room where it was dried for about 20 days at a temperature of about 55° C. and a relative humidity of 50%, with about 25 air changes in the drying room. The sausage was removed from the dry room when moisture to protein ratio of about 2.3:1 was reached. The resulting low-fat salami had an appearance, taste, and texture of its traditional counterpart, but only 50% of the fat.

EXAMPLE 2

A beef summer sausage containing about 3% fat was prepared by the following method. Ninety-seven pounds of beef ins and outs and 3 pounds of beef—75 were combined to produce a blend having a fat content of about 2.7%. The blend was then coarse ground into particles about ¼" in their longest dimension. To the resulting ground meat particles was added 0.05 pound lactic acid producing starter culture in 0.45 pound water. The ingredients were then thoroughly mixed until a uniform blend was obtained. Next, 2.44 pounds of a mixture of salt and nitrite were added and mixed into the blend. To the resulting mixture was then blended 0.70 pounds of dextrose, 0.57 pounds spices, and 0.18 pounds liquid smoke (Red Arrow Co., Manitowoc, Wis.)

Twenty pounds of the hydrolyzed milk protein gel particles prepared in accordance with the method outlined in Example 1, above, were added to the resulting blend and all the ingredients mixed, for about 3–5 minutes, until a homogeneous mass was obtained. The resulting admixture was then reground through a 7/64" grinder plate, while keeping the temperature of the admixture between about –2° C. to about 1° C. A multivane stuffer was used to stuff the admixture into a casings. The stuffed casings were then hung in fermentation chambers. The temperature in the chambers were maintained at 32° C. until the pH of the meat reached about 5.0. The casings were then moved to a heat chamber, where the temperature was raised at the rate of 5.5° C./hr. until the internal temperature of the sausage reached 65.5° C. The resulting low-fat beef summer sausage had an appearance, taste, and texture of its traditional counterpart, but only 3% fat.

EXAMPLE 3

A low-fat pepperoni having 50% of the fat content of its traditional counterpart was prepared by the following method. Three hundred eighty-four pounds of reduced-fat pork and 364 pounds of reduced-fat beef were combined to produce a blend having a fat content of about 19%. The blend was then coarse ground into particles having a particle size of about ¼" in their longest dimension. To the resulting ground meat particles were added 0.2 pound of a lactic acid starter culture in 4.7 pounds water and the ingredients thoroughly mixed until a uniform blend was obtained. Next, 25.6 pounds salt, 9.6 pounds flavorings, 7.5 pounds spices, 6.3 pounds sugar, 0.4 pounds dextrose, 0.1 pound dextrose, 0.1 pound sodium nitrite, and 0.1 pound antioxidant were added and mixed into the blend.

Two hundred pounds of hydrolyzed milk protein gel was prepared in accordance with the method outlined in Example 1, above, except that the gel was ground to form particles having a particle size of about ⅜" in their longest dimension. The hydrolyzed milk protein gel particles were added to the ground meat particles and mixed for about 3–5 minutes to form a homogeneous mass. The resulting admixture was then reground to form 7/16" particles and the particles stuffed into casings. The stuffed casings were then fermented at about 32° C. until the pH of the admixture reached about 5.0. The temperature was then raised (63° C. dry bulb, 57° C. wet bulb) until the internal temperature of the sausage reached 53° C. The sausage was kept at this temperature for two hours. The product was transferred to a dry room and was then dried under the controlled condition described in Example 1, above, to a moisture to protein ratio of 1.6:1. The resulting low-fat pepperoni had an appearance, taste, and texture of traditional pepperoni, but only 50% of the fat.

EXAMPLE 4

A cotto salami containing about 3% fat was prepared by the following method. Beef containing about 2.5% fat was ground through a ¼" plate. To seventy-five pounds of the resulting beef particles was added 12 pounds of hydrolyzed milk protein gel particles produced in accordance with the method outlined in Example 1, above. Also added were 14 pounds water, 2.8 pounds salt, 1.3 pounds non fat dry milk, 1.6 pounds corn syrup solids, 1.4 pounds dextrose, <0.1 pound sodium erythorbate, and <0.1 pound sodium nitrite. The temperature of the meat admixture was kept below about 3° C., while the ingredients were blended for about 3–4 minutes and then reground through a 5/32" plate. The resulting blend was then vacuum mixed in a vacuum blender for 4 minutes, after reaching the maximum vacuum.

The admixture was then stuffed into casings while under vacuum (26–28"Hg). The casings were placed on racks and cooked as follows:

| TIME (MIN) | DRY BULB (°C.) | WET BULB (°C.) | SMOKE |
| --- | --- | --- | --- |
| 30 | 60 | — | OFF |
| 60 | 63 | — | ON |
| 60 | 74 | — | ON |
| 90 | 74 | 66 | OFF |
| 120 | 85 | 74 | OFF |
| 60* | 85 | 77 | OFF |
| 30 | Cold Shower | | |

*until the internal temperature reached 69° C.

After cooking, the sausage was chilled in a chilled blaster to a temperature of about –1° C. to about 3° C. It was then sliced and packaged. The resulting cotto salami had the taste, appearance and texture of a traditional cotto salami, but only 10% of the fat.

While the invention has been described in detail with reference to certain preferred embodiments thereof, it will be understood that modifications and variations are within the spirit and scope of that which is described and claimed.

What is claimed is:

1. A fermentable ground meat product comprising:
   from about 95 wt. % to about 40 wt. % particles of ground meat,
   from about 5 wt. % to about 60 wt. % particles of a thermo-irreversible hydrolyzed milk protein gel having an appearance and texture that mimics the appearance and texture of adipose tissue, the gel particles being from about 1/32" to about 1" in their longest dimension, and
   an effective amount of an acid producing bacteria.

2. The fermentable, ground meat product in accordance with claim 1, wherein the hydrolyzed milk protein gel has a gel strength of between about 2500 gms and about 30,000 gms.

3. The fermentable, ground meat product in accordance with claim 2, wherein the ground meat is selected from the group consisting of beef, pork, poultry, mutton, or mixtures thereof.

4. The fermentable, ground meat product in accordance with claims 3, wherein the ground meat product has a fat content of about 35% or less, based on the weight of the ground meat product.

5. The fermentable, ground meat product in accordance with claim 4, wherein the ground meat product has a fat content of about 10% or less, based on the weight of the ground meat product.

6. The fermentable, ground meat product in accordance with claim 5, wherein the ground meat product has a fat content of about 5% or less, based on the weight of the ground meat product.

7. The fermentable, ground meat product in accordance with claim 5, further comprising from about 0.1 wt. % to about 1 wt. % sodium tripolyphosphate, based on the weight of the hydrolyzed milk protein gel.

8. The fermentable, ground meat product in accordance with claim 5, further comprising from about 0.2 wt. % to about 2 wt. % gelatin, based on the weight of the ground meat product.

9. The fermentable, ground meat product in accordance with claim 5, wherein the ground meat particles are present in an amount from about 70 wt. % to about 90 wt. % and the hydrolyzed milk protein gel particles are present in an amount from about 30 wt. % to about 10 wt. %.

10. The fermentable, ground meat product in accordance with claim 9, wherein the gel particles are from about 1/16" to about 3/4" in their longest dimension.

11. A fermentable, ground meat product comprising:
    from about 70 wt. % to about 90 wt. %, based on the weight of the meat product of particles of a low fat ground meat selected from the group consisting of beef, pork, poultry, mutton, or mixtures thereof,
    from about 30 wt. % to about 10 wt. %, based on the weight of the meat product of particles of a thermo-irreversible, hydrolyzed milk protein gel having an appearance and texture that mimics the appearance and texture of adipose tissue, the gel having a gel strength of between about 2500 gms and about 30,000 gms, and the gel particles having a particle size of from about 1/16" to about 3/4" in their longest dimension, and
    an effective amount of an acid producing bacteria.

12. The fermentable, ground meat product in accordance with claim 11, wherein the ground meat particles are present in an amount from about 78 wt. % to about 85 wt. % and the hydrolyzed milk protein gel particles are present in an amount from about 15 wt.% to about 22 wt. %.

13. The fermentable, ground meat product in accordance with claim 12, wherein the gel particles are from about 1/8" to about 3/8" in their longest dimension.

14. The fermentable, ground meat product in accordance with claim 13, wherein the ground meat product has a fat content of 5% or less, based on the weight of the ground meat product.

15. A fermented sausage product comprising:
    an admixture of thermo-irreversible hydrolyzed milk protein gel particles having an appearance and texture that mimics the appearance and texture of adipose tissue and ground meat particles, the average particle size of the gel particles being from about 0.5 to about 1.5 times the average particle size of the ground meat particles.

16. The fermented sausage product in accordance with claim 15, wherein the hydrolyzed milk protein gel has a gel strength of between about 2500 gms an about 30,000 gms.

17. The fermented sausage product in accordance with claim 16, wherein the ground meat is selected from the group consisting of beef, pork, poultry, mutton, or mixtures thereof.

18. The fermented sausage product in accordance with claim 17, wherein the fermented sausage product has a fat content of about 35% or less, based on the weight of the fermented sausage product.

19. The fermented sausage product in accordance with claim 18, wherein the fermented sausage product has a fat content of about 10% or less, based on the weight of the fermented sausage product.

20. The fermented sausage product in accordance with claim 19 wherein the fermented sausage product has a fat content of about 5% or less, based on the weight of the fermented sausage product.

21. The fermented sausage product in accordance with claim 19, further comprising from about 0.1 wt. % to about 1 wt. % sodium tripolyphosphate, based on the weight of the hydrolyzed milk protein gel.

22. The fermented sausage product in accordance with claim 19, further comprising from about 0.1 wt. % to about 2 wt. % gelatin, based on the weight of the fermented sausage product.

23. A fermented sausage product comprising:
    an admixture of ground meat particles selected from the group consisting of particles of beef, pork, poultry, mutton, or mixtures thereof, and
    thermo-irreversible, hydrolyzed milk protein gel particles having an appearance and texture that mimics the appearance and texture of adipose tissue, the gel having a gel strength of between about 2500 gms and about 30,000 gms, the average particle size of the gel particles being from about 0.5 to about 1.5 times the average particle size of the ground meat particles, and the fermented sausage product having a fat content of about 25% or less, based on the weight of the fermented sausage product.

24. The fermented sausage product in accordance with claim 23, wherein the ground meat particles are present in an amount from about 78 wt. % to about 85 wt. % and the hydrolyzed milk protein gel particles are present in an amount from about 15 wt. % to about 22 wt. %.

25. The fermented sausage product in accordance with claim 23, wherein the fermented sausage product has a fat content of 5% or less, based on the weight of the fermented sausage product.

26. The fermented sausage product in accordance with claim 23, wherein the fermented sausage is selected from the group consisting of Genoa salami, hard salami, and pepperoni.

* * * * *